Figure 1:
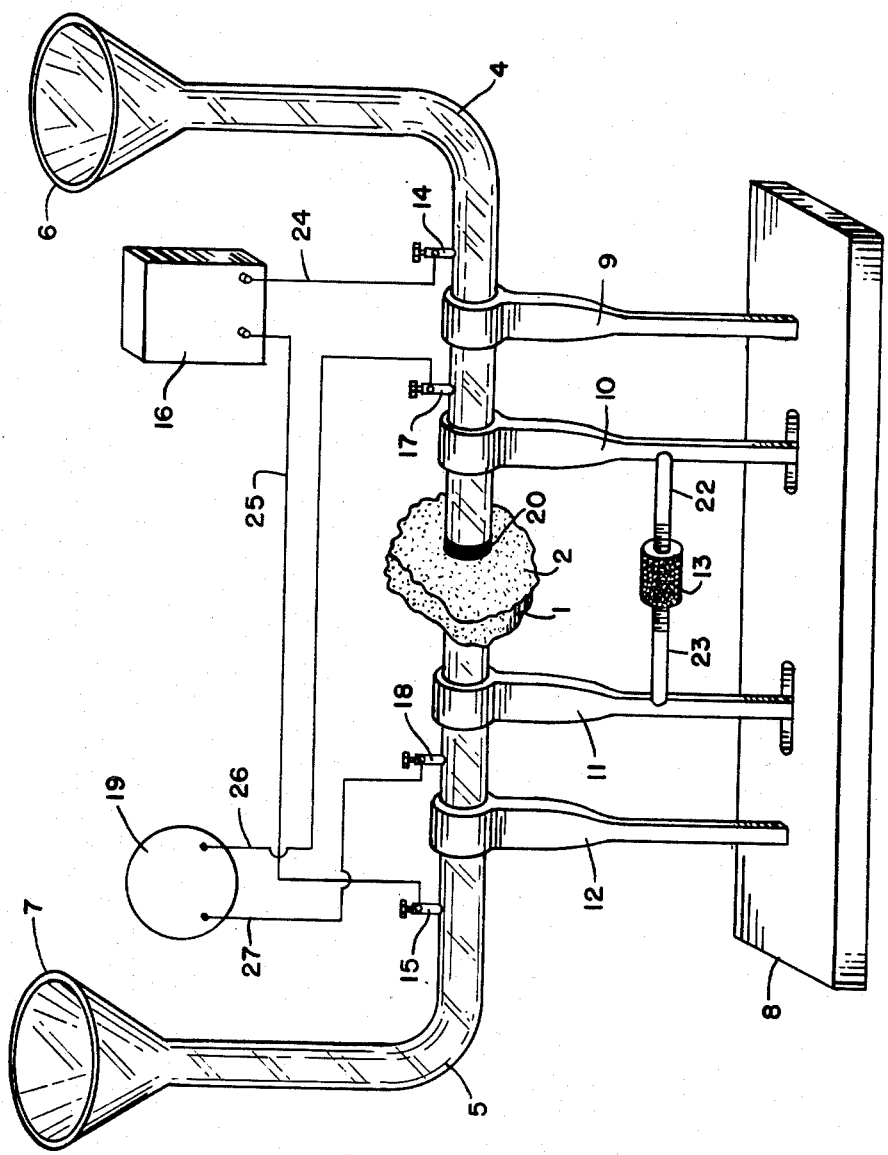

INVENTORS
Eugene R. Brownscombe
Emerson M. Connell Jr.

United States Patent Office 2,942,176
Patented June 21, 1960

2,942,176
METHOD AND APPARATUS FOR DETERMINING CHARACTERISTICS OF EARTH FORMATIONS

Eugene R. Brownscombe and Emerson M. Connell, Jr., Dallas, Tex., assignors to The Atlantic Refining Company, Philadelphia, Pa., a corporation of Pennsylvania Filed May 7, 1957, Ser. No. 657,578

14 Claims. (Cl. 324—13)

This invention relates to a method and apparatus for determining a factor or parameter of an earth formation. More particularly it relates to a method and apparatus for determining the resistance factor of an earth formation from a relatively small cutting obtained from said formation during the process of drilling.

In order to determine whether or not hydrocarbons are present in earth formations, it is necessary that certain characteristics of the formation be measured. Among these characteristics is that of formation resistance factor, commonly known as formation factor. Formation resistance factor, as is well known in the art, may be mathematically defined as the ratio of the resistivity of a sample of the formation which is 100% saturated with an electrically conductive fluid to the resistivity of the saturating fluid. Usually the saturating fluid is brine solution, but other electrically conductive fluids which wet and penetrate the interstices of the rock matrix may be used. By employing the calculated formation resistance factor, as defined above, in the Archie Equation, the actual water saturation of the subsurface formation in its native state may be obtained. This actual water saturation is then subtracted from unity to obtain the hydrocarbon saturation of the formation since it is assumed that all available pore space not filled with water is filled with hydrocarbons.

Heretofore, one method of determining formation factor has consisted of obtaining a core sample of known geometry, generally a right cylinder, computing the electrical resistivity of the saturated core, taking into consideration the height and cross-sectional area of the cylinder, and dividing this resistivity by the resistivity of the fluid used to saturate the core. This method has the advantage of being very accurate. There are, however, many disadvantages to this method, such as the expense and difficulty of obtaining cores. Securing core samples from formations thousands of feet below the earth's surface requires numerous man-hours of labor as well as the use of expensive and complicated equipment, and many times, due to the nature of the formation, it is impossible to obtain a suitable core. Further, there is always the possibility that a large sample, such as a core, will not be completely saturated with the conductive fluid; whereas, complete saturation can be assured when using an extremely small sample as in the present case.

The prior art also discloses methods for determining formation factor whereby a plurality of rock fragments are placed in a cell containing an electrically-conducting liquid and the resistivity of the cell is measured. Thereafter, the rock fragments are electrically insulated from the electrically-conducting liquid; and the resistivity of the cell is again measured. The ratio of these resistivities is then computed as a characteristic of the rock formation. These methods are desirable because they eliminate the expense and difficulty of obtaining cores. On the other hand, it is well known to those skilled in the art that constriction and inhomogeneity of current flow through the sample cell renders the analysis of rock samples by these methods inaccurate. It is also well known that the results obtained by employing these methods yield the average value of formation resistance factor for a number of rock samples rather than the formation resistance factor of a single rock sample. This is undesirable in many cases. In addition, the relatively large number of time-consuming operations necessary to the performance of these methods greatly limits the number of analyses which can be performed by an operator in a given time.

The oil industry has long felt a need, which has heretofore been unsatisfied, for a method and apparatus for determining the formation resistance factor of a single irregular-shaped rock sample, as distinguished from a large core sample or an aggregate of small rock samples, which provides all of the advantages of the afore-mentioned prior art with substantially none of the attendant disadvantages. It is to this end that the present invention is directed.

It is, therefore, one object of this invention to provide a method and apparatus whereby the resistance factor of a formation penetrated by a borehole may be determined without obtaining core samples from the formation.

Another object of this invention is to provide a method and apparatus whereby the resistance factor of a formation penetrated by a borehole may be determined by making electrical measurements on cuttings normally obtained from the return stream of fluids employed in drilling through the formation.

A further object of this invention is to provide a method and apparatus whereby the resistance factor of individual irregular-shaped rock samples may be determined by making electrical measurements on the rock samples.

Another and further object of this invention is to provide a method and apparatus whereby the resistance factor of an irregular-shaped rock sample may be determined with a high degree of accuracy in a minimum amount of time.

Another object of this invention is to provide a method and apparatus whereby the resistance factor of an irregular-shaped rock sample may be determined without constricting the path of current flow of electric currents used in making the determination.

Other objects and advantages of this invention will become apparent from the following description taken in connection with the accompanying drawings.

Figure 2:
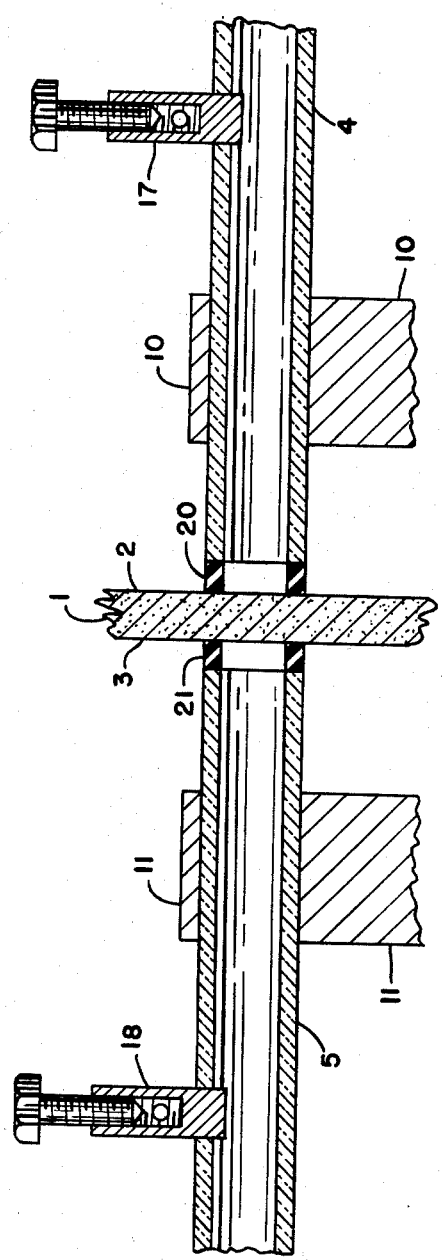

In the drawings, Figure 1 is a diagrammatic view of the preferred form of apparatus for determining the formation factor of a rock sample in accordance with the method of this invention, and Figure 2 is an enlarged sectional elevation of part of the apparatus shown in Figure 1.

Briefly, the present invention relates to a method and apparatus whereby an irregular-shaped rock sample or cutting to be tested is ground to a uniform thickness, saturated with an electrically conductive liquid, and mounted between the opposed ends of two conductor elements having a preselected cross-sectional area. These conductor elements are preferably capillary tubes filled with brine solution. An electric current is then passed through one conductor element, the saturated sample and the other conductor element, while a measurement is simultaneously made of the voltage drop across the sample. The formation resistance factor is calculated on the basis of the cross-sectional area of the ends of the conductor elements in contact with the surfaces of the sample, the thickness of the prepared rock sample, the resistance of the saturated rock sample to current flow, and the resistivity of the electrically conductive fluid. It is to be noted that only the resistivity of substantially that portion of the sample which is located between the opposed ends of the conductor elements is measured.

We have found that the most accurate results are obtained when the cross-sectional area of the capillary tube is at least as great as six times the square of the sample thickness; for example, a sample thickness of 0.08 cm. or less should be employed where the capillary tube cross-sectional area is 0.04 cm.$^2$. Of course, capillary tubes smaller than the exemplified size would require thinner samples; whereas, with larger capillary tubes thicker samples could be used. It is desirable to employ this ratio of sample thickness to capillary tube cross-sectional area in order to reduce the dilation of the path of current passing through the sample to a minimum. Thus, if a capillary tube having a circular cross-section is used, a resistance measurement can be made across a thin cutting which is substantially electrically equivalent to the same measurement made across a cylindrical sample having a diameter equal to the internal diameter of the capillary tube.

The apparatus utilized in connection with practicing the method of this invention is shown in its entirety in Figure 1, and the most unique features are detailed in Figure 2. An irregular rock sample or cutting 1, having two parallel plane surfaces 2 and 3 formed thereon, is employed for making formation resistance factor determinations. Rock sample 1 is disposed between the opposed ends of capillary tubes 4 and 5 so that corresponding areas on surfaces 2 and 3, respectively, are enclosed thereby. The opposite ends of capillary tubes 4 and 5 are bent upward and terminate in flared ends 6 and 7, respectively, to facilitate filling. Capillary tubes 4 and 5, with rock sample 1 disposed therebetween, are supported by base member 8 and support assemblies 9, 10, 11, and 12. Turnbuckle 13 is provided to adjust the relative distance between the opposed ends of capillary tubes 4 and 5. Current electrodes 14 and 15 extend through the walls of capillary tubes 4 and 5, respectively, and are connected to alternating current source 16. Likewise, potential electrodes 17 and 18 extend through the walls of capillary tubes 4 and 5, respectively, and are in turn connected to voltmeter 19.

Glass, or any other desirable nonconducting material, may be used for constructing capillary tubes 4 and 5. It is preferable that the capillary tubes be identical in size and shape so that they will have the same resistance when filled with the same electrically conductive fluid, although this is not essential since slight corrections may be introduced into the calculation of the formation resistance factor to compensate for differences in the tubes. It is also preferable that sealing rings 20 and 21 be secured to the opposed ends of capillary tubes 4 and 5, respectively, by a suitable adhesive, or the like. Sealing rings 20 and 21 may be constructed of any nonconducting resilient material, such as nylon, neoprene, or rubber and are adapted to be pressed into sealing engagement with surfaces 2 and 3 of rock sample 1. In addition, sealing rings 20 and 21 should have substantially the same cross-sectional dimensions as capillary tubes 4 and 5, and should be thin enough that they will not be readily deformed upon application of sealing pressure. As hereinbefore mentioned, the opposite ends of capillary tubes 4 and 5 are bent upward and terminate in flared ends 6 and 7, respectively. This facilitates filling the capillary tubes with brine solution, or other electrically conductive fluids.

Any expedient means may be used for supporting and holding capillary tubes 4 and 5 in the proper position. For instance, as shown in Figure 1, one end of support assemblies 9 and 12 is fixedly mounted on base member 8, as by welding. The other ends of support assemblies 9 and 12 provide slideable supports for capillary tubes 4 and 5. Support assemblies 10 and 11 are slideably mounted on base member 8 at one end, and the other ends of support assemblies 10 and 11 are fixedly attached to capillary tubes 4 and 5, respectively. Threaded members 22 and 23 are rigidly mounted to support members 10 and 11 and are oppositely threaded. Turnbuckle 13 threadably connects threaded members 22 and 23. Thus, by manipulating turnbuckle 13, the relative distance between the opposed ends of capillary tubes 4 and 5 can be adjusted to accommodate different thicknesses of rock samples and the necessary pressure applied to force sealing rings 20 and 21 into sealing engagement with surfaces 2 and 3 of rock sample 1. It is preferable that the supporting means be designed in such a manner that capillary tubes 4 and 5 will be held in substantial axial alignment.

The electrical elements of this invention generally include current electrodes 14 and 15, which are connected by means of leads 24 and 25 to alternating current source 16, and potential electrodes 17 and 18, which are connected by means of leads 26 and 27 to voltmeter 19. Electrodes 14, 15, 17, and 18 are each constructed of a good electrical conducting material, such as silver or copper; and they are preferably molded into the glass or other material of which the capillary tube walls are composed so that their lower surfaces are exposed to make electrical contact with the electrically conductive fluid contained in the capillary tubes. Electrodes shaped as an annular ring, which could be molded into the capillary walls with their inner surfaces exposed to the conductive liquid in the capillary tubes, would also be satisfactory. While the relative positions of the electrodes, as shown in Figure 1, are not critical, it is necessary that a potential electrode and a current electrode be located on either side of rock sample 1 so that current may be passed through the sample and the resultant voltage drop thereacross measured. Of course, it would be possible to use only two electrodes, pass current between them and simultaneously measure the voltage drop thereacross; however, this would be undesirable because the voltage measurement would be affected by any polarization or electrolysis of the conductive fluid adjacent the electrodes.

Voltmeter 19 and alternating current source 16 are conventional instruments and are well known in the art. It is preferable that voltmeter 19 be a high impedance instrument, such as a vacuum tube voltmeter, since any current which passes through voltmeter 19 rather than rock sample 1 will cause a corresponding error in the data obtained. Moreover, although a direct current source may be used, it is advantageous to employ an alternating current source because polarization and electrolysis will be reduced to a minimum.

In preparing sample 1, a drill cutting or rock sample from a desired formation is selected so as to be of a suitable size. The selected cutting is cleaned of hydrocarbons and deleterious matter in any desired manner, as by flushing it with a hydrocarbon solvent, such as naphtha, and then drying it in an oven at 212° F. for several hours to evaporate the hydrocarbon solvent and any moisture which might be present in the pores of the sample. After cleaning, material is removed from opposite sides of the sample in any convenient manner, such as by grinding or sanding, to produce two smooth plane faces on the sample which are parallel to each other. Thereafter, fine sandpaper may be used to polish both faces of the sample. The cutting, having thus been cleaned and sanded, is ready to be washed to remove foreign matter and saturated with brine solution.

The saturated rock sample 1, prepared by the aforementioned method, or any other desirable method, is placed between sealing rings 20 and 21, which are attached to capillary tubes 4 and 5. Pressure is applied to capillary tubes 4 and 5 by means of turnbuckle 13 so that sealing rings 20 and 21 are forced into sealing engagement with surfaces 2 and 3 of rock sample 1 and the ends of capillary tubes 4 and 5. This also serves to maintain rock sample 1 in place. Care should be taken to make sure that the pressure used to press the sealing rings 20 and 21 against surfaces 2 and 3 is not sufficient to deform the resilient sealing rings to such an extent that the areas on surfaces 2 and 3 normally defined by the sealing rings are materially changed. After this pressure has been applied, capillary tubes 4 and 5 are completely filled with brine solution through flared ends 6 and 7. If difficulty is encountered in completely filling capillary tubes 4 and 5 with brine solution due to air becoming trapped in the capillary tubes, it may be desirable to first fill capillary tubes 4 and 5 with brine solution and then mount rock sample 1 between the ends of the capillary tubes while they are submerged in brine solution. Thereafter a measured electric current is passed through the brine solution in capillary tube 4, rock sample 1 and the brine solution in capillary tube 5 by applying an electric potential from alternating current source 16 between current electrodes 14 and 15, while simultaneously measuring the voltage drop between potential electrodes 17 and 18 with voltmeter 19. After correction for the resistance of the brine between potential electrodes 17 and 18 and the surfaces 2 and 3 of rock sample 1, the voltage drop between potential electrodes 17 and 18 serves as an indication of the resistance of the brine-saturated rock sample 1, which may be used together with the thickness of rock sample 1 and the cross-sectional area of the bore of the capillary tubes 4 and 5 to determine the formation resistance factor of the formation from which the rock sample 1 was taken.

It is suggested that a standard cross-sectional area and configuration of the capillary tube bore, a standard current and a standard sample thickness be arbitrarily chosen. This will allow voltmeter 19, which measures the voltage drop between potential electrodes 17 and 18, to be calibrated directly in formation resistance factor, thereby greatly increasing the number of rock samples which can be analyzed by an operator in a given time.

Having thus described our invention, it is to be understood that such description has been given by way of illustration and example only and not by way of limitation, reference for the latter purpose being had to the appended claims.

We claim:

1. An apparatus for determining the resistance factor of a formation from a single rock sample obtained from said formation which has two parallel, plane surfaces formed thereon, comprising the combination of two opposing, elongated conducting means having one end thereof formed as a plane surface of preselected cross-sectional area and adapted to contact corresponding, opposing surfaces of said sample, said preselected cross-sectional area being less than the total surface area of said plane surfaces, an electric current source connected to each of said conducting means adjacent the other ends thereof and adapted to define a current path through said conducting means and said sample, and means for measuring the potential drop between two points intermediate the ends of said conducting means.

2. An apparatus for determining the resistance factor of a formation from a single rock sample obtained from said formation which has two parallel, plane surfaces formed thereon, comprising the combination of two opposing, elongated fluid containers having one end thereof formed with a preselected internal cross-sectional area and adapted to contact corresponding, opposing surfaces of said sample in fluid-tight relationship and maintain a body of electrically conductive fluid in contact with said plane surfaces of said sample, said preselected cross-sectional area being less than the total surface area of said plane surfaces, an electric current source in electrical connection with each of said bodies of electrically conductive fluid adjacent the other ends of said elongated fluid containers and adapted to define a current path through said bodies of electrically conductive fluid and said sample, and means for measuring the potential drop between two points in said electrically conductive fluid intermediate the ends of said elongated fluid containers.

3. An apparatus for determining the resistance factor of a formation from a rock sample obtained from said formation which has two parallel, plane surfaces formed thereon, comprising the combination of two opposing capillary tubes having one end thereof formed with a bore of preselected cross-sectional area and adapted to contact corresponding, opposing surfaces of said sample in fluid-tight relationship and maintain a body of electrically conductive fluid in contact with said plane surfaces of said sample, said preselected cross-sectional area being less than the total surface area of said plane surfaces, an electric current source in electrical connection with each of said bodies of electrically conductive fluid adjacent the other ends of said capillary tubes and adapted to define a current path through said bodies of electrically conductive fluid and said sample, and means for measuring the potential drop between two points in said electrically conductive fluid intermediate the ends of said capillary tubes.

4. An apparatus for determining the resistance factor of a formation from a rock sample obtained from said formation which has two parallel, plane surfaces formed thereon, comprising the combination of two opposing capillary tubes having one end thereof formed with a bore of preselected cross-section area and adapted to contact corresponding, opposing surfaces of said sample in fluid-tight relationship and maintain a body of electrically conductive fluid in contact with said plane surfaces of said sample, said preselected cross-sectional area being less than the total surface area of said plane surfaces, supporting means adapted to hold said capillary tubes in substantial axial alignment, an electric current source in electrical connection with each of said bodies of electrically conductive fluid adjacent the other ends of said capillary tubes and adapted to define a current path through said bodies of electrically conductive fluid and said sample, and means for measuring the potential drop between two points in said electrically conductive fluid intermediate the ends of said capillary tubes.

5. An apparatus for determining the resistance factor of a formation from a rock sample obtained from said formation which has two parallel, plane surfaces formed thereon, comprising the combination of two opposing capillary tubes having one end thereof formed with a bore of preselected cross-sectional area and adapted to contact corresponding, opposing surfaces of said sample in fluid-tight relationship and maintain a body of electrically conductive fluid in contact with said plane surfaces of said sample, said preselected cross-sectional area being less than the total surface area of said plane surfaces, adjustable means for bringing the opposed ends of said capillary tubes into pressure contact with said plane surfaces of said sample, an electric current source in electrical connection with each of said bodies of electrically conductive fluid adjacent the other ends of said capillary tubes and adapted to define a current path through said bodies of electrically conductive fluid and said sample, and means for measuring the potential drop between two points in said electrically conductive fluid intermediate the ends of said capillary tubes.

6. An apparatus for determining the resistance factor of a formation from a rock sample obtained from said formation which has two parallel, plane surfaces formed thereon, comprising the combination of two opposing capillary tubes having one end thereof formed with a bore of preselected cross-sectional area and adapted to contact corresponding, opposing surfaces of said sample in fluid-tight relationship and maintain a body of electrically conductive fluid in contact with said plane surfaces of said sample, said preselected cross-sectional area being less than the total surface area of said plane surfaces, a source of alternating electric current in electrical connection with each of said bodies of electrically conductive fluid adjacent the other ends of said capillary tubes and adapted to define a current path through said bodies of electrically conductive fluid and said sample, and means for measuring the potential drop between two points in said electrically conductive fluid intermediate the ends of said capillary tubes.

7. An apparatus for determining the resistance factor of a formation from a rock sample obtained from said formation which has two parallel, plane surfaces formed thereon, comprising the combination of two opposing capillary tubes having one end thereof formed with a bore of preselected cross-sectional area and adapted to contact corresponding, opposing surfaces of said sample in fluid-tight relationship and maintain a body of electrically conductive fluid in contact with said plane surfaces of said sample, said preselected cross-sectional area being less than the total surface area of said plane surfaces and at least as great as six times the square of the thickness of said sample, an electric current source in electrical connection with each of said bodies of electrically conductive fluid adjacent the other ends of said capillary tubes and adapted to define a current path through said bodies of electrically conductive fluid and said sample, and means for measuring the potential drop between two points in said electrically conductive fluid intermediate the ends of said capillary tubes.

8. A method for determining a characteristic of a rock formation comprising the steps of obtaining a single irregular rock cutting from said formation, removing material from opposite sides of said cutting to form two parallel, plane surfaces on said cutting, saturating said cutting with an electrically conductive fluid, passing an electric current between said plane surfaces of said cutting by applying an electric potential to a predetermined, corresponding area on each of said plane surfaces of said cutting, and measuring the resistance to flow of said electric current through said cutting.

9. A method for determining a characteristic of a rock formation comprising the steps of obtaining a single irregular rock cutting from said formation, removing material from opposite sides of said cutting to form two parallel, plane surfaces on said cutting, saturating said cutting with an electrically conductive fluid, passing an electric current of known magnitude between said plane surfaces of said cutting by applying an electric potential to a predetermined, corresponding area on each of said plane surfaces of said cutting, and measuring the resistance to flow of said electric current through said cutting.

10. A method for determining a characteristic of a rock formation comprising the steps of obtaining a single irregular rock cutting from said formation, removing material from opposite sides of said cutting to form two parallel, plane surfaces on said cutting, saturating said cutting with an electrically conductive fluid, passing an electric current of known magnitude between said plane surfaces by applying an electric potential to a predetermined, corresponding area on each of said plane surfaces of said cutting, each of said corresponding areas being at least as great as six times the square of the thickness of said cutting, and measuring the resistance to flow of said electric current through said cutting.

11. A method for determining a characteristic of a rock formation comprising the steps of obtaining an irregular rock sample from said formation, removing material from opposite sides of said sample to form two parallel, plane surfaces on said sample, saturating said sample with an electrically conductive fluid, passing an electric current of known magnitude between said plane surfaces of said sample by applying an electric potential to a predetermined, corresponding area on each of said plane surfaces of said sample, each of said corresponding areas being less than the total surface area of said plane surface of which it is a part, and measuring the resistance to flow of said electric current through said sample.

12. A method for determining a characteristic of a rock formation comprising the steps of obtaining an irregular rock sample from said formation, removing material from opposite sides of said sample to form two parallel, plane surfaces on said sample, saturating said sample with an electrically conductive fluid, passing an electric current of known magnitude between said plane surfaces of said sample by applying an electric potential to a predetermined, corresponding area on each of said plane surfaces of said sample, each of said corresponding areas being less than the total surface area of said plane surface of which it is a part and at least as great as six times the square of the thickness of said sample, and measuring the resistance to flow of said electric current through said sample.

13. A method for determining a characteristic of a rock formation comprising the steps of obtaining an irregular rock sample from said formation, removing material from opposite sides of said sample to form two parallel, plane surfaces on said sample, saturating said sample with an electrically conductive fluid, maintaining a confined body of said electrically conductive fluid in contact with a predetermined, corresponding area on each of said surfaces of said sample, each of said corresponding areas being less than the total surface area of said plane surface of which it is a part and at least as great as six times the square of the thickness of said sample, passing an electric current of known magnitude between said plane surfaces of said sample by applying an electric potential to said confined bodies of electrically conductive fluid, and measuring the resistance to flow of said electric current through said sample.

14. A method for determining a characteristic of a rock formation comprising the steps of obtaining an irregular rock sample from said formation, removing material from opposite sides of said sample to form two parallel, plane surfaces on said sample, saturating said sample with an electrically conductive fluid, maintaining a confined body of said electrically conductive fluid in contact with a predetermined, corresponding area on each of said surfaces of said sample, each of said corresponding areas being less than the total surface area of said plane surface of which it is a part and at least as great as six times the square of the thickness of said sample, passing an alternating electric current of known magnitude between said plane surfaces of said sample by applying an alternating electric potential to said confined bodies of electrically conductive fluid, and measuring the resistance to flow of said alternating electric current through said sample.

References Cited in the file of this patent
UNITED STATES PATENTS

| | | |
|---|---|---|
| 1,545,186 | Henriksen et al. | July 7, 1925 |
| 2,645,752 | Glanville et al. | July 14, 1953 |
| 2,745,057 | Dotson | May 8, 1956 |